United States Patent
Wagatsuma et al.

(10) Patent No.: US 9,099,123 B1
(45) Date of Patent: Aug. 4, 2015

(54) MAGNETIC SENSOR HAVING OPTIMAL FREE LAYER BACK EDGE SHAPE AND EXTENDED PINNED LAYER

(71) Applicant: HGST Netherlands B.V., Amsterdam (NL)

(72) Inventors: Takashi Wagatsuma, Odawara (JP); Yukimasa Okada, Odawara (JP); Katsumi Hoshino, Odawara (JP); Kouji Kataoka, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/178,179

(22) Filed: Feb. 11, 2014

(51) Int. Cl.
*G11B 5/39* (2006.01)

(52) U.S. Cl.
CPC .............. *G11B 5/3909* (2013.01); *G11B 5/398* (2013.01)

(58) Field of Classification Search
USPC .......... 360/324, 324.1, 324.11, 324.12, 324.2
See application file for complete search history.

(56) References Cited

U.S. PATENT DOCUMENTS

| | | | |
|---|---|---|---|
| 5,986,856 A | 11/1999 | Macken et al. | |
| 6,952,328 B2 * | 10/2005 | Hasegawa | 360/324.12 |
| 6,992,870 B2 * | 1/2006 | Kagami et al. | 360/324.2 |
| 7,057,859 B2 * | 6/2006 | Kagami et al. | 360/317 |
| 7,159,304 B2 | 1/2007 | Arasawa et al. | |
| 7,606,008 B2 | 10/2009 | Sbiaa et al. | |
| 7,859,799 B2 * | 12/2010 | Watanabe et al. | 360/324.1 |
| 8,072,712 B2 | 12/2011 | Ishizone et al. | |
| 8,089,734 B2 * | 1/2012 | Miyauchi et al. | 360/319 |
| 8,675,318 B1 * | 3/2014 | Ho et al. | 360/324.11 |
| 8,842,396 B1 * | 9/2014 | Zhu | 360/324.12 |
| 8,922,954 B2 * | 12/2014 | Cao et al. | 360/324 |
| 2002/0034054 A1 | 3/2002 | Michel et al. | |
| 2003/0099069 A1 * | 5/2003 | Kagami et al. | 360/313 |
| 2003/0202294 A1 * | 10/2003 | Terunuma | 360/313 |
| 2004/0012899 A1 * | 1/2004 | Hasegawa et al. | 360/324.12 |
| 2004/0061986 A1 * | 4/2004 | Kagami et al. | 360/324.11 |
| 2004/0150922 A1 * | 8/2004 | Kagami et al. | 360/324.2 |
| 2006/0018055 A1 | 1/2006 | Haginoya et al. | |
| 2007/0206333 A1 | 9/2007 | Watanabe et al. | |
| 2009/0034129 A1 * | 2/2009 | Yanagisawa et al. | 360/313 |
| 2009/0274837 A1 * | 11/2009 | Hara et al. | 427/128 |
| 2012/0134057 A1 | 5/2012 | Song et al. | |

FOREIGN PATENT DOCUMENTS

JP 2007220154 A 8/2007

OTHER PUBLICATIONS

Wu, H. et al., "High Density Magnetic Data Storage," World Scientific Publishing Co. Pte. Ltd., 2009, pp. 1-68.

* cited by examiner

*Primary Examiner* — Brian Miller
(74) *Attorney, Agent, or Firm* — Zilka-Kotab, PC (57) ABSTRACT

A magnetic read sensor having an extended pinned layer and having a free layer structure with a back edge formed at an angle for optimizing sensor performance and pinned layer pinning. The magnetic free layer has a back edge that is formed at an angle of between 6 and 10 degrees relative to a plane parallel with the air bearing surface plane. The magnetic sensor can be formed by forming the free layer stripe height with an ion milling that is performed at an angle of 6 to 10 degrees relative to normal.

7 Claims, 14 Drawing Sheets

MAGNETIC SENSOR HAVING OPTIMAL FREE LAYER BACK EDGE SHAPE AND EXTENDED PINNED LAYER

FIELD OF THE INVENTION

The present invention relates to magnetic data recording and more particularly to a magnetic read head having an extended pinned layer structure and a free layer having a back edge formed at an angle for optimized sensor performance and stability.

BACKGROUND OF THE INVENTION

In recent years, as information technology has developed, interest has focused on the greater processing speeds of central processing units (CPU), as well as the increase in storage capacity of storage devices. Among these developments, magnetic disk storage devices are most often used as large capacity storage devices, and research is being performed into further increases in their speed and data density.

Magnetic read heads that use magnetoresistive (MR) effect elements are used for reading the information on the magnetic disks of magnetic disk storage devices. Magnetoresistive effect elements normally have a structure in which an antiferromagnetic layer, a pinned layer, a non-magnetic intermediate layer, a free layer, and a cap layer are stacked in that order. Due to the effect of the magnetic disk information magnetic field, the magnetization direction of the free layer is changed with relative to the magnetization direction of the pinned layer, whose magnetic force direction is fixed by the antiferromagnetic layer, and this changes the overall resistance of the magnetoresistive effect element. The electrical resistance across the magnetoresistive effect element is proportional to the relative directions of magnetization of the free and pinned layers. Therefore, as the relative orientation of magnetization of the free and pinned layers changes, the resulting change in electrical resistance can be detected as a magnetic signal.

The known formats of magnetoresistive effect elements include the current-in-plane (CIP) format in which current flows parallel to the film surfaces of the magnetoresistive effect element, the current perpendicular to plane (CPP) format in which the current flows perpendicular to the film surfaces, the giant magnetoresistive (GMR) format and the tunneling magnetoresistive (TMR) format. As a result of the high density recording capacity in recent years, the CPP-GMR format and the TMR format have become the main formats used.

As magnetoresistive effect elements become smaller, the magnetic stability of the sensor becomes worse. For example, the reduced area between the pinned layer and the AFM layer reduces the exchange coupling between these layer and, therefore, reduces the pinning strength of the sensor. Japanese Unexamined Patent Application Publication No. 2007-220154 discloses a step structure for the top surface of the pinned layer of a junction end portion in the height direction of a TMR element, wherein the pinned layer extends further from the air bearing surface than the free layer. This can increase the area of the pinned layer for improved pinning strength. However, such a design that incorporates an extended pinned layer presents its own challenges with regard to manufacturability and sensor performance.

SUMMARY OF THE INVENTION

The present invention provides a magnetic sensor, that includes a magnetic free layer structure that extends from an air bearing surface to a first stripe height measured from the air bearing surface and that has a back edge opposite the air bearing surface that is formed at an angle of 6 to 10 degrees with respect to a plane parallel with the air bearing surface. The sensor also has a magnetic pinned layer structure that extends beyond the first stripe height, and a non-magnetic layer sandwiched between the magnetic free layer structure and the magnetic pinned layer structure.

The magnetic sensor can be formed by a method that includes depositing a magnetic pinned layer structure, depositing a non-magnetic layer over the magnetic pinned layer structure and depositing a magnetic free layer structure over the non-magnetic layer. A mask is formed over the magnetic free layer structure, the mask having a back edge that is located a desired distance from an air bearing surface plane so as to define a first stripe height. An ion milling is then performed to remove portions of the magnetic free layer that are not protected by the first mask, the ion milling being performed at an angle of 6 to 10 degrees relative to normal so as to form the magnetic free layer with a back edge that defines an angle of 6 to 10 degrees relative to the air bearing surface plane.

Forming the back edge of the free layer with an angle of between 6 and 10 degrees optimizes sensor free sensor performance as well as pinned layer stability. If the back edge angle is less than 6 degrees the pinned layer may be damaged by the ion milling used to form the free layer back edge, and the strength of pinning of the magnetization of the pinned layer can suffer. On the other hand, if the angle is greater than 10 degrees the performance of the sensor (MR ratio) decreases. Forming the back edge of the free layer with a back edge angle of 6-10 degrees avoids both of these problems, thereby optimizing sensor performance and robustness.

These and other features and advantages of the invention will be apparent upon reading of the following detailed description of preferred embodiments taken in conjunction with the figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
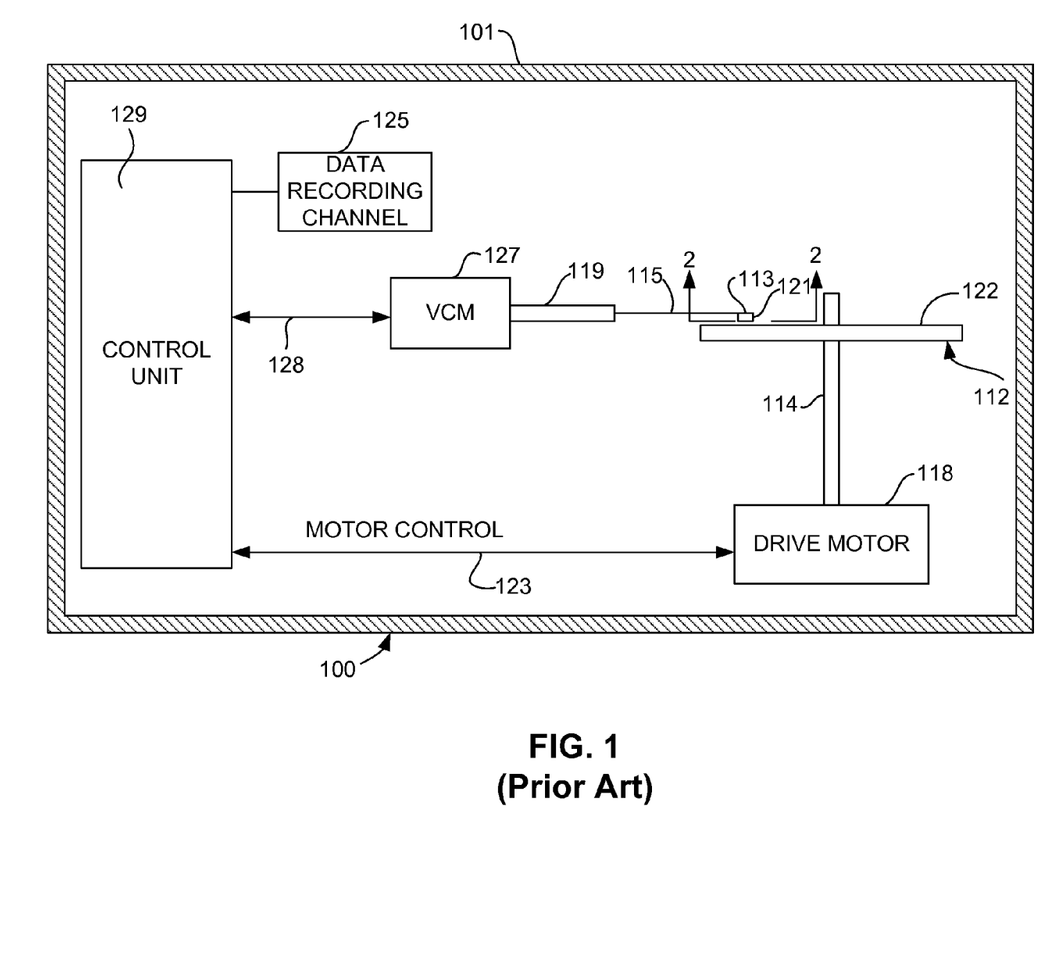
FIG. 1 is a schematic illustration of a disk drive system in which the invention might be embodied.

Referring now to FIG. 1, there is shown a disk drive 100 embodying this invention. The disk drive 100 includes a housing 101. At least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
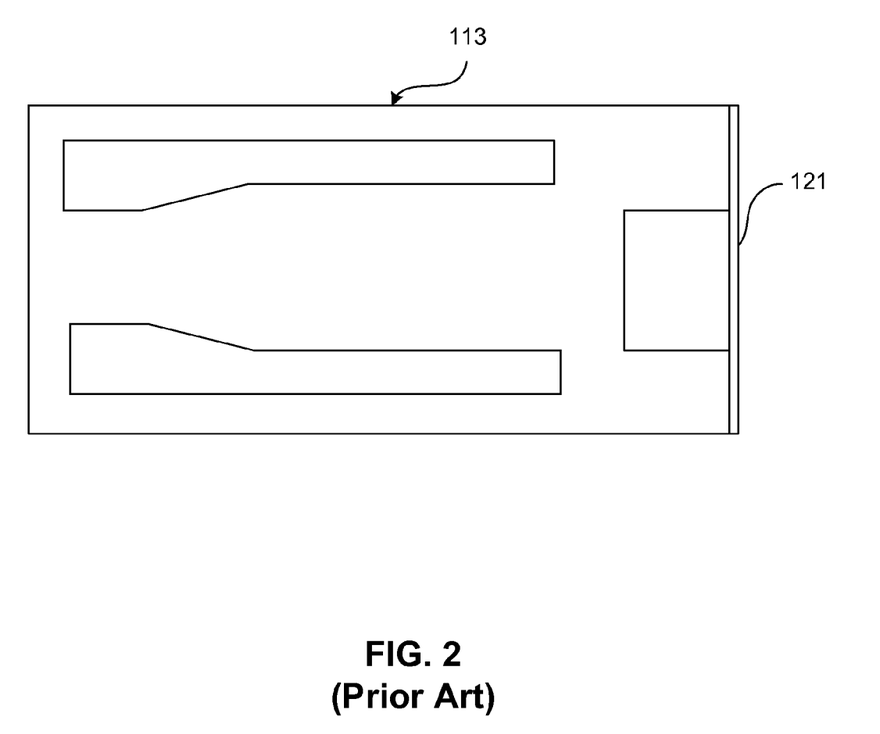
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system and the accompanying illustration of FIG. 1 are for representation purposes only. It should be apparent that disk storage systems may contain a large number of disks and actuators, and each actuator may support a number of sliders.

Figure 3:
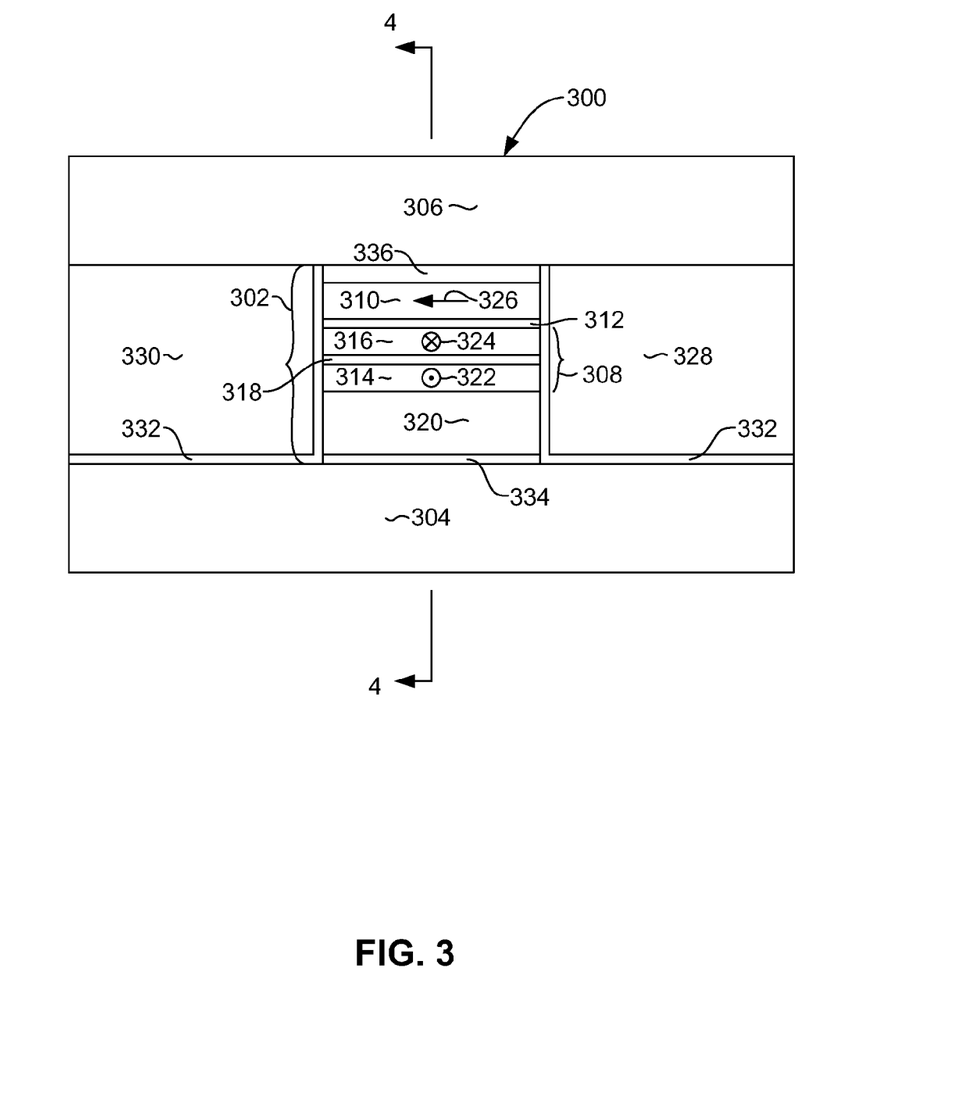
FIG. 3 is an air bearing surface view of a magnetic read sensor.

FIG. 3 shows a view of a magnetic read head 300 according to a possible embodiment of the invention as viewed from the air bearing surface. FIG. 3 shows a magnetic read sensor, 300 that includes a sensor stack 302 that is sandwiched between first and second magnetic shields 304, 306. The magnetic shields 304, 306 can be constructed of an electrically conductive, magnetic material such as NiFe so that they can function as electrical leads for supplying a sense current to the sensor stack 302.

The sensor stack 302 can include a magnetic pinned layer structure 308, a magnetic free layer structure 310 and a non-magnetic barrier or spacer layer 312, sandwiched between the magnetic pinned layer structure 308 and magnetic free layer structure 310. If the sensor 300 is a giant magnetoresistive (GMR) sensor, then the layer 312 can be a non-magnetic, electrically conductive material such as Cu or AgSn. If the sensor 300 is a tunnel junction magnetic sensor (TMR), then the layer 312 can be a non-magnetic, electrically insulating layer such as MgO.

The pinned layer structure can be an anti-parallel pinned structure including a first magnetic layer (AP1) 314, a second pinned layer (AP2) 316 and a non-magnetic, anti-parallel coupling layer such as Ru 318 sandwiched between the first and second magnetic layers (AP1 and AP2 layers) 314, 316. The first magnetic layer 314 can be exchange coupled with a layer of antiferromagnetic material AFM layer 320, which can be a material such as IrMn or PtMn. This exchange coupling can be used to pin the magnetization of the first magnetic layer 314 in a first direction perpendicular to the air bearing surface as indicated by arrow head symbol 322. Anti-parallel coupling between the first and second magnetic layers 314, 316 pins the magnetization of the second magnetic layer 316 in a second direction that is perpendicular to the air bearing surface and anti-parallel with the first direction, as indicated by arrow tail symbol 324.

The magnetic free layer 310 has a magnetization that is generally oriented parallel with the air bearing surface as indicated by arrow 326, but that is free to move in response to an external magnetic field. The magnetization 326 can be biased by magnetic bias structures 328, 330 at either side of the sensor stack. The bias structures 328, 330 can be hard or soft bias structures, and can be separated from the sensor stack and from the bottom shield 304 by a thin insulation layer 332 such as alumina.

The sensor stack 302 can also include a seed layer 334 at its bottom. The seed layer can be provided to initiate a desired grain growth in the above formed layers. In addition, the sensor stack 302 can include a non-magnetic, electrically conductive capping layer 336 at its top, above the free layer 310. The capping layer 336 can be used to protect the free layer 310 from damage or corrosion during manufacture of the sensor 300.

Figure 4:
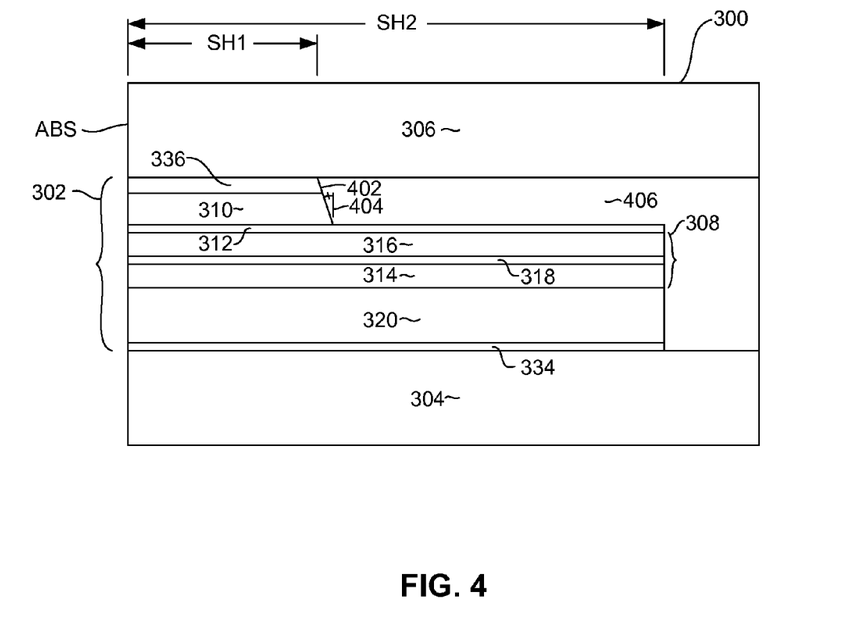
FIG. 4 is a side cross sectional view of the sensor of FIG. 3 as seen from line 4-4 of FIG. 3.

FIG. 4 is a side, cross sectional view as seen from line 4-4 of FIG. 3. In FIG. 4 it can be seen that the free layer structure 310 extends to a first stripe height SH1 as measured from the air bearing surface ABS. The pinned layer structure 308 extends to a second stripe height SH2, also measured from the air bearing surface, the second stripe height SH2 being longer than the first stripe height SH1. The first stripe height SH1 defines the effective, magnetic stripe height of the sensor. However, the extended stripe height SH2 of the pinned layer structure improves pinning strength of the pinned layer structure 308. As sensor size becomes smaller in order to provide increased data density, maintaining strong pinning of the pinned layer structure becomes more difficult. Extending the pinned 308 layer as shown improves this pinning strength, thereby allowing for the production of a very small, high resolution magnetic sensor that is also reliable and robust. Extending the pinned layer structure 308 as shown in FIG. 4 improves pinning in multiple ways. First the area of exchange coupling between the magnetic layer 314 and the AFM layer 320 is increased. Also, the extended shape of the magnetic layers 314, 316 provides a shape enhanced magnetic anisotropy that also improves pinning.

As can be seen in FIG. 4, the free layer 310 has a back edge 402 that defines an angle 404 with respect to a plane that is parallel with the air bearing surface ABS. The space behind the back edge 404 can be filled with a non-magnetic, electrically insulating fill material 406. The inventors have discovered that the magnitude of this angle 404 has a significant effect on sensor performance. If the angle 404 is too small, there is a risk of damage to the pinned layer structure during an ion milling process used to define the stripe height SH1 of the free layer 310 (this ion milling will be discussed below). Therefore, if this angle 404 is too small, the magnetic resonance frequency of the pinned layer 308 suffers and pinning strength is thereby reduced. This can result in a loss of pinning which can lead to catastrophic failure of the magnetic sensor 300.

On the other hand if the angle 404 is too large, magnetic performance of the sensor 300 (more specifically the MR ratio) suffers. If the angle 404 becomes too large, the variation in the direction of the magnetization 326 (FIG. 3) increases, and the MR ratio is degraded. Therefore, optimal sensor performance can be achieved by ensuring that the angle 404 is between 6 and 10 degrees. A method for forming the sensor 300 with such an angle 404 is described herein below.

Figure 5:
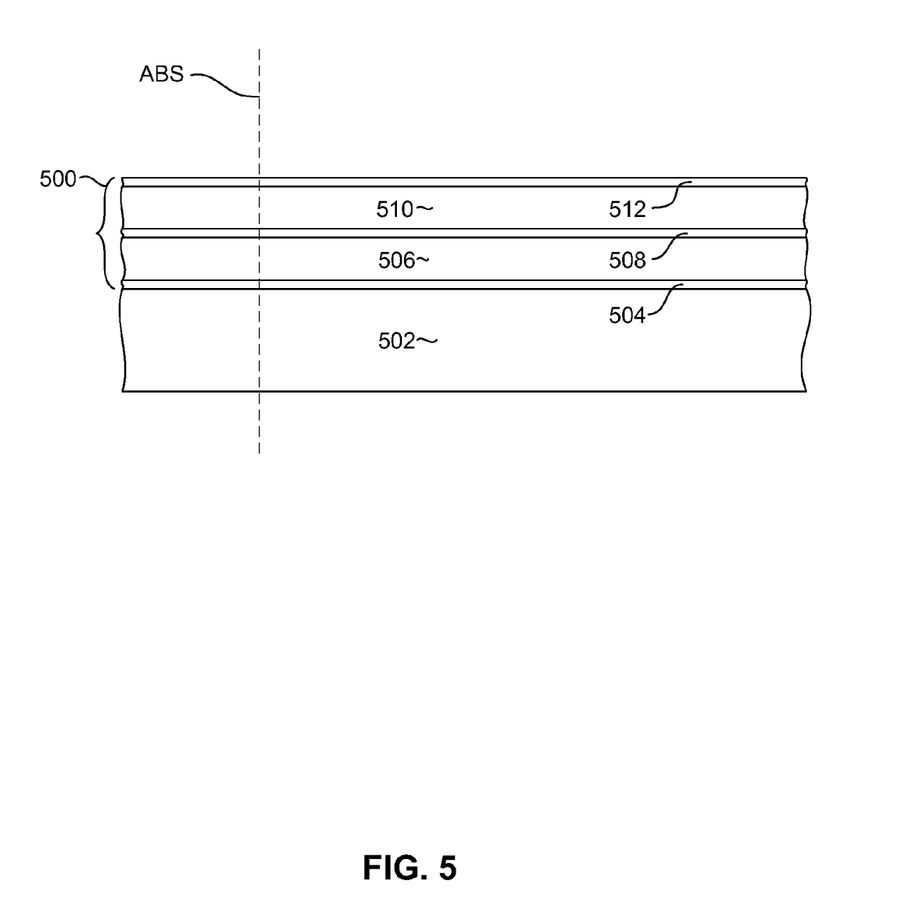
FIGS. 5-12 are views of a magnetic sensor in various intermediate stages of manufacture, illustrating a method of manufacturing a magnetic sensor.

FIGS. 5-12 show a magnetic sensor in various intermediate stages of manufacture in order to illustrate a method of manufacturing a magnetic sensor having a desired free layer back edge configuration. With reference now to FIG. 5 a bottom shield 502 is formed having a smooth planar upper surface. A series of sensor layers 500 is deposited over the shield 502. The series of sensor layers 500 can include a seed layer 504, a pinned layer structure 506 a non-magnetic spacer or barrier layer 508, a magnetic free layer 510 and a capping layer 512. The pinned layer structure, while being shown as a single layer for purposes of simplicity in FIG. 5, can include multiple layers such as the layers 320, 314, 316, 318 of FIGS. 3 and 4. In FIG. 5, the location of an air bearing surface plane is indicated by the dashed line denoted as ABS.

Figure 6:
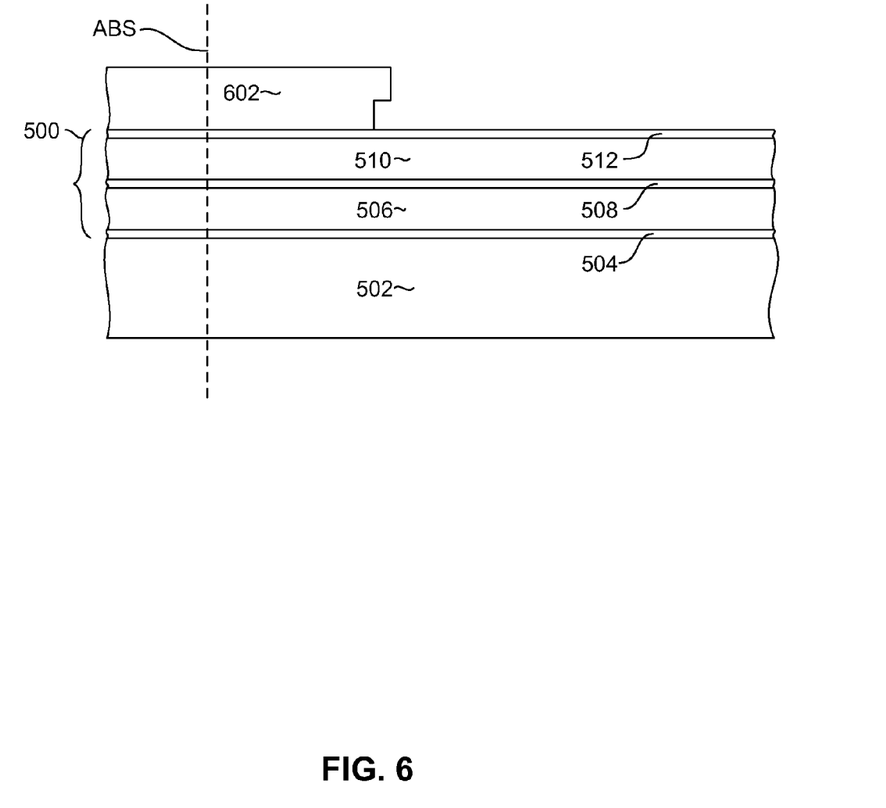

With reference to FIG. 6 a mask 602 is formed over the sensor layers. The mask 602 is preferably a bi-layer mask having an overhanging portion 602 as shown, and has a back edge 604 that is located a desired distance from the air bearing surface plane ABS so as to define a first stripe height, as will be seen.

Figure 7:
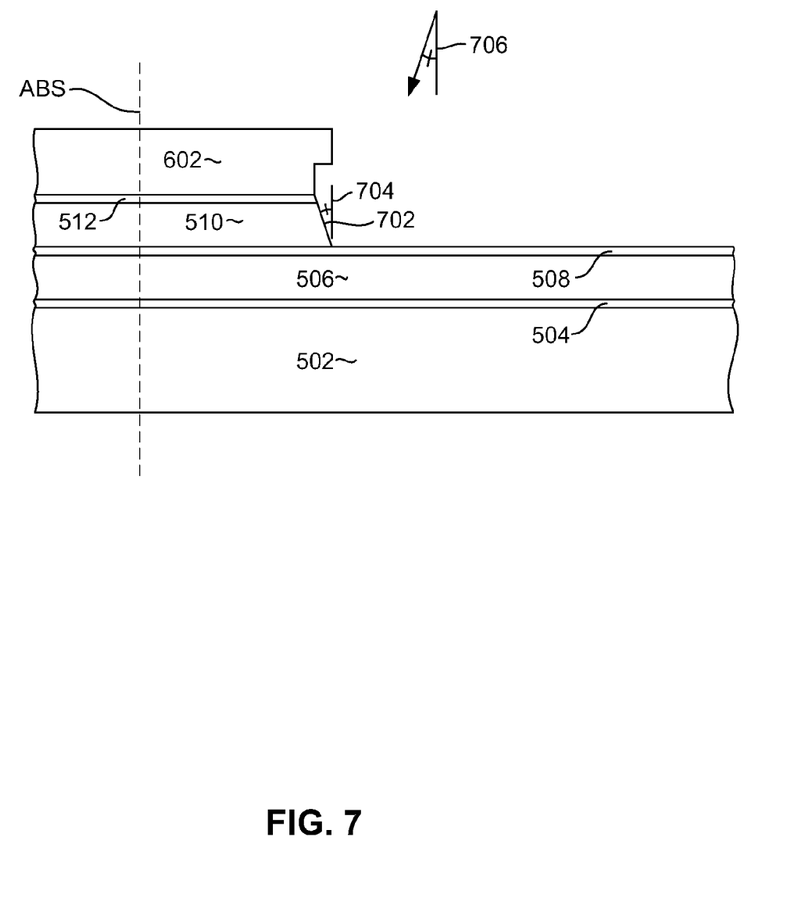

With reference now to FIG. 7, an ion milling process is performed to remove portions of the capping layer 512 and magnetic free layer 510 that are not protected by the mask 602. The ion milling is terminated when the barrier/spacer layer 508 is reached, thereby leaving the pinned layer 506 extending beyond the free layer 510. More preferably, the ion milling is terminated immediately before the spacer/barrier layer 508 has been reached, so that even though the angle 702 of the back edge of the free layer 510 is between 6 and 10 degrees there is no possibility of shunting due to re-deposition of material from the ion milling process. The ion milling is performed in such a manner as to form a back edge 702 of the magnetic free layer 510 that defines an angle 704 that is 6 to 10 degrees with respect to the ABS plane. In other words, the angle 704 is 80 to 84 degrees with respect to the plane of the as deposited layers 504, 506, 508, 510, 512. To achieve this effect, the ion milling is preferably performed at an angle 706 that is 6-10 degrees with respect to normal. Performing the ion milling in this manner minimizes the re-deposition of material on the back edge 702 of the sensor 510 and on the barrier/spacer layer 508 or pinned layer 506.

Figure 8:
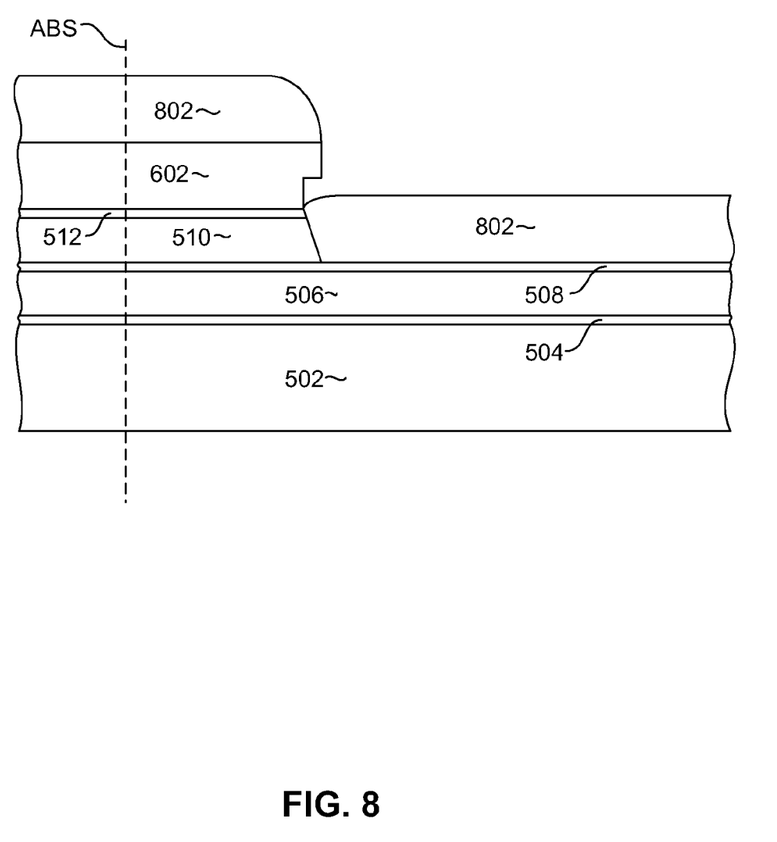
Figure 9:
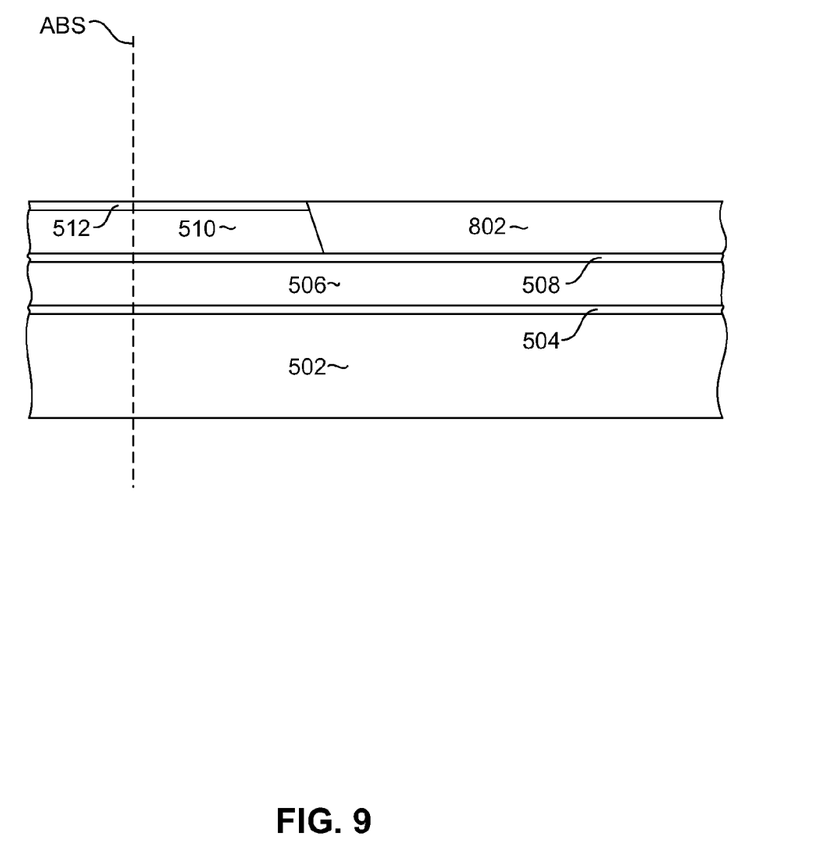

With reference now to FIG. 8 a non-magnetic, electrically insulating fill layer such as alumina 802 is deposited to at least the level of the capping layer 512. The fill layer 802 can be deposited by a process such as sputter deposition. Then, the mask 602 is removed. The mask 602 can be removed by a chemical liftoff process or other suitable process. The bi-layer shape of the mask 602 allows the liftoff chemicals to reach the mask 602, thereby facilitating removal of the mask 602. An optional chemical mechanical polishing process may also be performed to planarize the structure, leaving a structure with a smooth planar surface as shown in FIG. 9.

Figure 10:
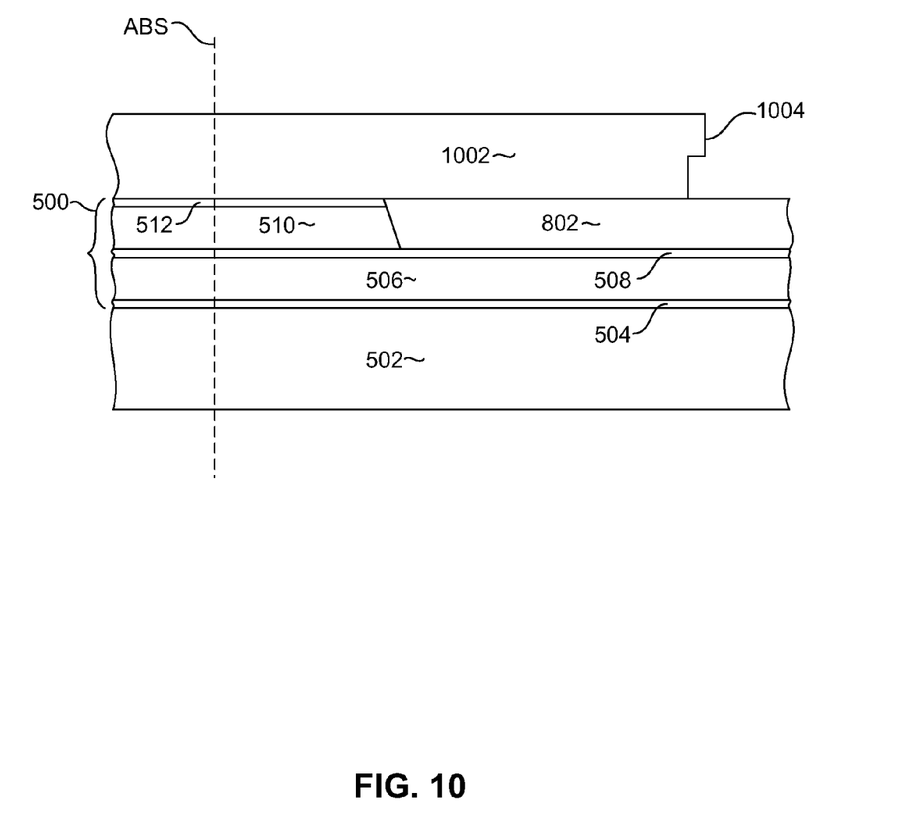
Figure 11:
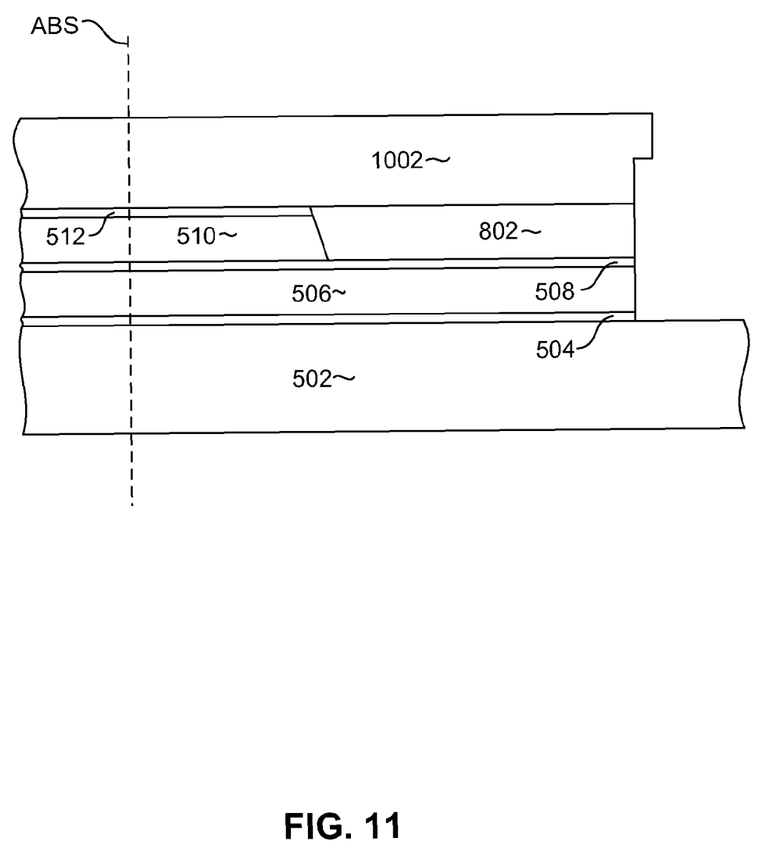
Figure 12:
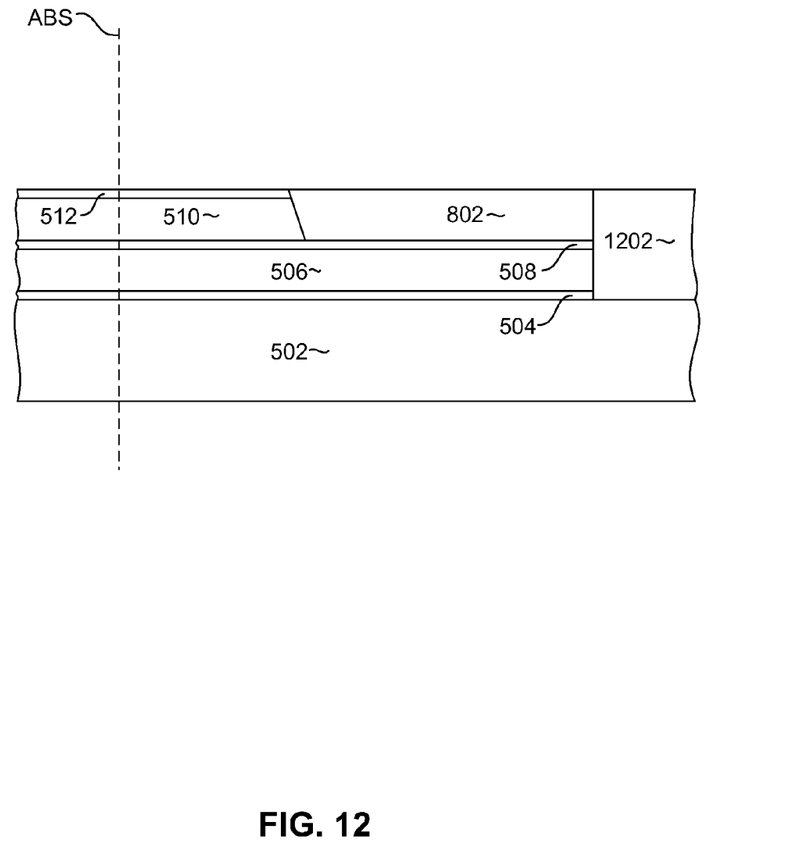

With reference to FIG. 10, another mask 1002 is formed over the sensor material 500 and fill layer 802. This mask has a back edge 1004 that is located so as to define a back edge of the pinned layer, or second stripe height, as will be seen. A second ion milling can then be performed. The second ion milling can be performed until the bottom shield 502 has been reached, leaving a structure as shown in FIG. 11. Then, a second process of fill layer deposition, mask liftoff and optional chemical mechanical polishing can be performed, leaving a structure as shown in FIG. 12 with a second fill layer 1202.

Figure 13:
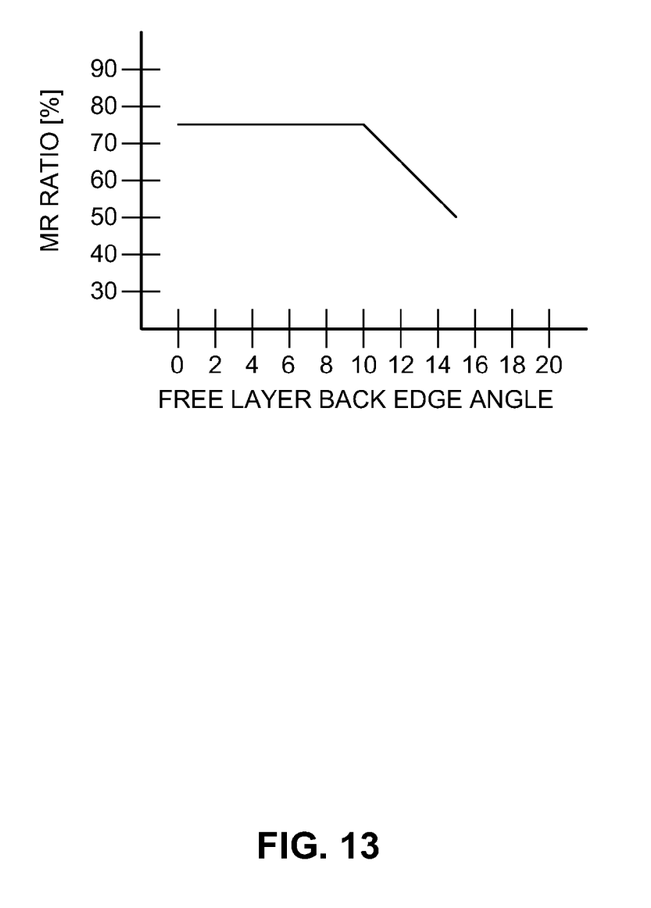
FIG. 13 is a graph illustrating a relationship between free layer back edge angle and MR ratio.
Figure 14:
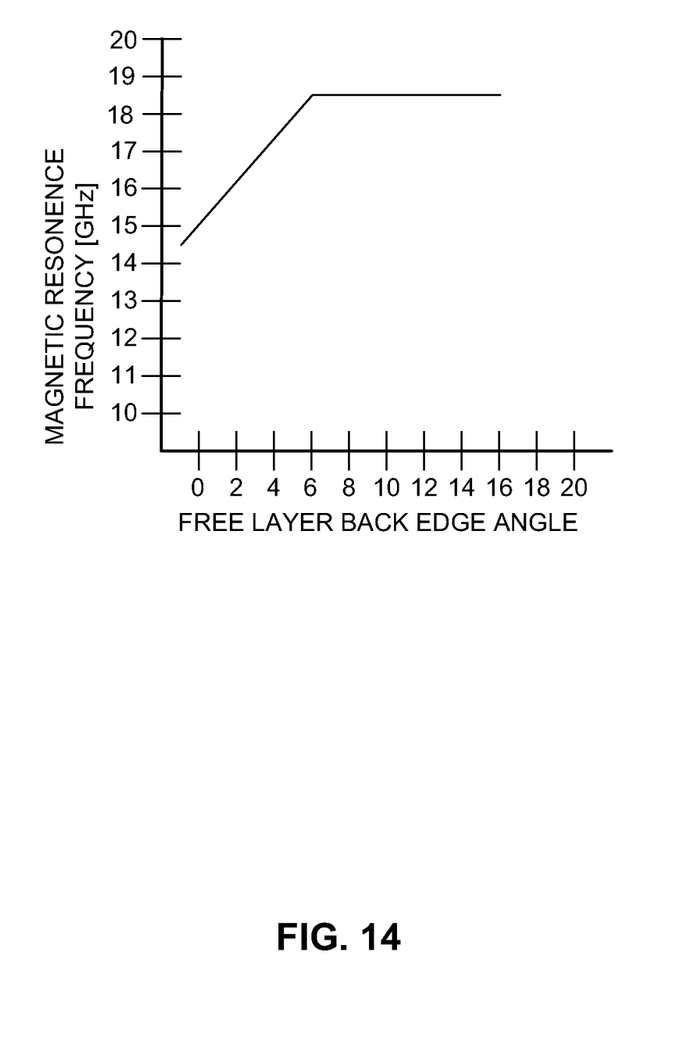
FIG. 14 is a graph illustrating a relationship between free layer back edge angel and magnetic resonance frequency.

FIGS. 13 and 14 show graphs that help to illustrate the advantages of forming a sensor with the desired back edge angle 404 described above with reference to FIG. 4. With particular reference to FIG. 13 it can be seen that the sensor performance (MR ratio) remains substantially constant until the free layer back edge angel reaches about 10 degrees. At this point the sensor performance drops off linearly with increasing free layer back edge angle. On the other hand, with reference to FIG. 14 it can be seen that the pinning strength as determined by magnetic resonance frequency of the pinned layer structure 308 (FIGS. 3 and 4) increases until the free layer back edge angle reaches 10 degrees. Therefore, it can be seen that an optimal balance of pinning robustness and sensor performance can be achieved when the free layer back edge angle is maintained at between 6 and 10 degrees.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic sensor, comprising:
   a magnetic free layer structure that extends from an air bearing surface to a first stripe height as measured from the air bearing surface and having a back edge opposite the air bearing surface that is formed at an angle of 6 to 10 degrees with respect to a plane parallel with the air bearing surface;
   a magnetic pinned layer structure that extends beyond the first stripe height; and
   a non-magnetic layer sandwiched between the magnetic free layer structure and the magnetic pinned layer structure.

2. The magnetic sensor as in claim 1, wherein the non-magnetic layer is an electrically insulating barrier layer.

3. The magnetic sensor as in claim 1, wherein the non-magnetic layer is an electrically conductive spacer layer.

4. The magnetic sensor as in claim 1, wherein the back edge of the magnetic free layer structure has no re-deposited material formed on it.

5. The magnetic sensor as in claim 1, wherein the pinned layer structure further comprises first and second magnetic layers and a non-magnetic anti-parallel coupling layer sandwiched there-between.

6. The magnetic sensor as in claim 1, wherein the pinned layer structure further comprises first and second magnetic layers, a non-magnetic anti-parallel coupling layer sandwiched there-between, the magnetic sensor further comprising a layer of anti-ferromagnetic material exchange coupled with the first magnetic layer.

7. The magnetic sensor as in claim 1, further comprising a non-magnetic, electrically insulating fill layer in a region beyond the first stripe height, the non-magnetic, electrically insulating fill layer contacting the back edge of the magnetic free layer, there being no re-deposited material between the non-magnetic, electrically insulating fill layer and the back edge of the magnetic free layer structure.

* * * * *